US008512871B2

(12) United States Patent
Persky et al.

(10) Patent No.: US 8,512,871 B2
(45) Date of Patent: Aug. 20, 2013

(54) EROSION BARRIER FOR THERMAL BARRIER COATINGS

(75) Inventors: Joshua Persky, Boulder, CO (US); David A. Litton, Rocky Hill, CT (US); David L. Lambert, Clinton, CT (US)

(73) Assignee: United Technologies Corporation, Hartford, CT (US)

( * ) Notice: Subject to any disclaimer, the term of this patent is extended or adjusted under 35 U.S.C. 154(b) by 2392 days.

(21) Appl. No.: 11/443,796

(22) Filed: May 30, 2006

(65) Prior Publication Data

US 2010/0247323 A1 Sep. 30, 2010

(51) Int. Cl.

*F03B 3/12* (2006.01)
*B32B 15/04* (2006.01)
*B32B 3/10* (2006.01)

(52) U.S. Cl.

USPC ........... 428/472; 428/209; 428/446; 428/698; 428/701; 428/702; 416/241 R; 416/241 B; 60/722

(58) Field of Classification Search

None

See application file for complete search history.

(56) References Cited

U.S. PATENT DOCUMENTS

| | | | | |
|---|---|---|---|---|
| 5,308,806 | A * | 5/1994 | Maloney et al. | 501/95.2 |
| 6,261,643 | B1 | 7/2001 | Hasz et al. | |
| 6,335,105 | B1 * | 1/2002 | McKee | 428/623 |
| 6,964,933 | B2 * | 11/2005 | Yeckley | 501/98.1 |
| 2001/0051218 | A1 | 12/2001 | Wittenauer et al. | |
| 2003/0077477 | A1 * | 4/2003 | Bruce et al. | 428/632 |
| 2004/0022949 | A1 * | 2/2004 | Hasezaki et al. | 427/376.2 |
| 2004/0115416 | A1 | 6/2004 | Nonninger et al. | |
| 2005/0048305 | A1 * | 3/2005 | Ackerman et al. | 428/544 |
| 2005/0079368 | A1 * | 4/2005 | Gorman et al. | 428/469 |
| 2005/0112398 | A1 * | 5/2005 | Darolia et al. | 428/632 |
| 2006/0086479 | A1 * | 4/2006 | Parkos et al. | 164/369 |
| 2007/0099027 | A1 * | 5/2007 | Krishnamurthy et al. | 428/698 |
| 2007/0104969 | A1 * | 5/2007 | Nagaraj et al. | 428/469 |
| 2009/0114797 | A1 * | 5/2009 | Beals et al. | 249/175 |

FOREIGN PATENT DOCUMENTS

| | | |
|---|---|---|
| EP | 0381179 | 8/1990 |
| EP | 0783043 | 7/1997 |
| EP | 1788122 | 5/2007 |
| WO | WO 95/26431 | 10/1995 |
| WO | WO 2005/071141 | 8/2005 |

OTHER PUBLICATIONS

CRC Materials Science and Engineering Handbook. 3rd Edition, by J. Shackelford and W. Alexander. CRC Press, 2001, p. 1-7.*

* cited by examiner

*Primary Examiner* — Vera Katz
(74) *Attorney, Agent, or Firm* — Bachman & LaPointe, P.C.

(57) ABSTRACT

A workpiece, such as a turbine engine component, comprises a substrate, a thermal barrier coating on the substrate, and a hard erosion barrier deposited over the thermal barrier coating. The erosion barrier preferably has a Vickers hardness in the range of from 1300 to 2750 kg/mm$^2$. The erosion barrier may be formed from aluminum oxide, silicon carbide, silicon nitride, or molybdenum disilicide. The erosion barrier may be formed using either an electrophoretic deposition process or a slurry process.

18 Claims, 2 Drawing Sheets

EROSION BARRIER FOR THERMAL BARRIER COATINGS

BACKGROUND OF THE INVENTION (1) Field of the Invention

The present invention relates to an erosion barrier for thermal barrier coatings and to processes for forming the erosion barrier.

(2) Prior Art

Many turbine engine components are provided with a thermal barrier coating to protect the underlying substrate. High velocity particles in the gas path of an engine cause considerable erosion damage to the thermal barrier coating. The erosion of the thermal barrier coating leads to premature failure of the coated turbine engine part.

Thus, it is highly desirable to form a hard exterior shell strongly bonded to the thermal barrier coating.

SUMMARY OF THE INVENTION

Accordingly, in accordance with the present invention, a hard exterior shell strongly bonded to the thermal barrier coating is formed.

In one aspect of the present invention, a workpiece broadly comprises a substrate, a thermal barrier coating on the substrate, and a hard erosion barrier deposited over the thermal barrier coating. The erosion barrier preferably has a Vickers hardness in the range of from 140 to 2750 kg/mm$^2$. The erosion barrier may be formed from aluminum oxide, silicon carbide, silicon nitride, and molybdenum disilicide.

In a second aspect of the present invention, a process for forming an erosion barrier for protecting a thermal barrier coating on a workpiece is provided. The process broadly comprises the steps of forming a suspension of ceramic particles suspended in a solvent, depositing particles in the suspension on the thermal barrier coating, and drying the particles deposited on said thermal barrier coating so as to form an erosion barrier coating having a Vickers hardness in the range of from 1300 to 2750 kg/mm$^2$.

Other details of the erosion barrier for thermal barrier coatings of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention involves forming a hard shell exterior coating which acts as an erosion barrier on a thermal barrier coating applied to a substrate such as a turbine engine component. The exterior coating erosion barrier may be formed by applying a slurry and removing the solvent and/or by electrophoretic deposition.

Figure 1:
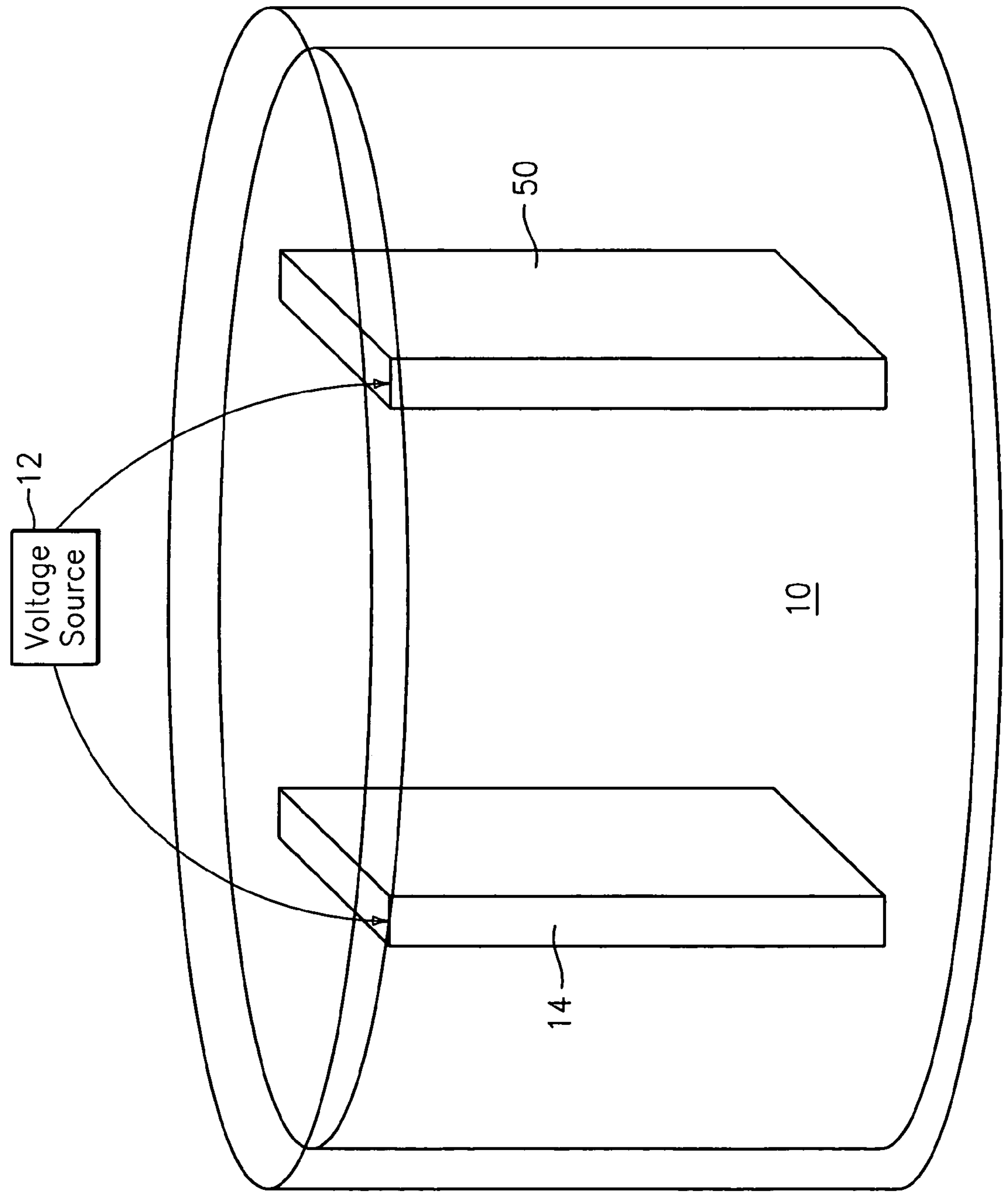
FIG. 1 is a schematic representation of an apparatus for forming an erosion barrier on a workpiece having a thermal barrier coating.

With regard to the electrophoretic deposition, as shown in FIG. 1, the workpiece 50, such as a turbine engine component or part, forming the substrate is immersed in a suspension 10 and electrically connected to one terminal of a voltage source

12. A second electrode 14, which may be formed from any suitable electrically conductive material known in the art, is electrically connected to a second terminal of the voltage source 12.

Prior to immersion in the suspension, a thermal barrier coating 52, such as a zirconia based thermal barrier coating, is typically applied to the turbine engine component 50. The thermal barrier coating 52 may be applied to the turbine engine component using any suitable technique known in the art.

The suspension 10 consists of very fine ceramic particles ranging in size from about 0.02 microns to 0.2 microns in sol form. Preferably, the ceramic particles have a size in the range of from about 0.02 to 0.05 microns. The ceramic particles may be suspended in a solvent such as water, alcohols including, but not limited to, ethanol or methanol, and water-alcohol mixtures. One can use organic solvents, such as tricholoethane, however, such use may be prohibited by health and environmental issues.

In the simplest embodiment, an aluminum oxide (alumina) sol is put in suspension in water, alcohol, or mixtures thereof, and stabilized by the addition of sufficient acid to keep the pH of the solution below 4.25. This results in a positive charge on the alumina particles, such that they repel each other, avoiding agglomeration and sedimentation of the particles out of solution. Candidates for acids to be added to the solution include, but is not limited to, nitric acid, hydrochloric acid, acetic acid, and stearic acid. Reducing the pH of the solution as low as 2.0 is possible, but low pHs could result in acid attack of any exposed metal on the parts or components to be coated in the suspension. The preferred pH for alumina sol suspensions in water and/or alcohol is from 3.0 to 4.5. The part or component 50 to be coated may be strongly biased with a negative DC voltage to accelerate the suspended particles in the suspension toward the thermal barrier coated surface of the part or component 50. Typical negative biasing voltages range from about 50 to 2000V, preferably from about 900 to 1100V. Higher voltages lead to higher deposition rates, but are potentially hazardous by increasing the system's potential energy to a level that can compromise workplace safety.

In addition to alumina sol in suspension, other hard ceramic materials that would be suitable include silicon nitride sol, silicon carbide sol, and molybdenum disilicide sol. The suitable pH range required to produce a stable suspension varies with the composition of the fine ceramic particles in the suspension. This is due to surface chemistry variations which lead to different buildups of charge on the surfaces of the particles as a function of the pH of the suspension. At low pH, surfaces are positively charged, and at high pH, surfaces are negatively charged. Thus, there exists a pH level that corresponds to zero surface charge on the particles, which is known as the isoelectric point or pHiep. Alumina has a pHiep of 4.5, while silicon nitride has a pHiep of 9.0, silicon nitride has a pHiep of 5.4, and molybdenum disilicide has a pHiep of 2.2.

Since the present invention may be used to form hard shell materials deposited on zirconia based thermal barrier coatings, it may also be advantageous to operate in a pH range that results in negative charge on the zirconia based coatings. This can be done by operating above the PHiep of zirconia which is 4.0. With regard to alumina particles in a suspension, the biasing of the zirconia coating would supply plenty of negative charge to the zirconia surface, thereby extending the useable pH lower limit downwards to 3.0.

As discussed above, strong acids do tend to attack the metals forming the substrate of the part or component as well as metallic coatings. For this reason, silicon nitride may have an advantage over the other coatings since its pHiep is high at 9.0. This system has the additional advantage of being able to be deposited at neutral pH, which has health and safety advantages.

The pH level at which the electrophoretic deposition is carried out may be raised by modifying the surface chemistry of the sols prior to putting them into suspension. For example, nitriding alumina sols, or aluminizing molybdenum disilicide sols may raise the operating pH level, minimizing damage to parts or components 50.

While the foregoing has discussed the addition of an acid to control the pH, one could also add a base to the suspension to maintain the pH equal to or greater than 7.0. Typical bases to add include ammonium hydroxide and aluminum hydroxide.

The thermal stability of alumina, as well as its excellent hardness, makes it the preferred material for the erosion barrier coating.

Hardness of the hard shell materials at room temperature are:

Alumina: Vickers hardness, approx. 2650 kg/mm$^2$;

Silicon nitride: Vickers hardness, approx. 1900 kg/mm$^2$;

Silicon carbide: Vickers hardness, approx. 2750 kg/mm$^2$; and

Molybdenum disilicide: Vickers hardness, approx. 1300 kg/mm$^2$.

The suspension may be maintained at a temperature in the range of from about room temperature (68° F.) to 120° F., with room temperature being preferred for cost minimization.

The concentration of sols in the suspensions may range from about 0.001 wt % to 5.0 wt % solids. Preferably, the concentration of sols in the suspensions may be from about 0.005 to 0.05 wt % solids.

After the part or component 50 is removed from the suspension after the erosion barrier coating has been deposited, it may be dried using any suitable drying technique known in the art. Drying may be carried out at a temperature in the range of from about room temperature to 650° F. Drying times at room temperature may range from about 1.0 to 20 hours, preferably from about 3.0 to 10 hours. At drying temperatures in the range of 250° F. to 650° F., the drying times may be reduced from about 0.5 to 5.0 hours with a preferred drying time range of from about 1.0 to 2.0 hours.

After drying, the coated part or component may be subjected to a sintering operation to form strong bonds within the deposited erosion barrier coating and between the erosion barrier coating and the thermal barrier coating. Also, sintering reduces porosity in the erosion barrier coating which drives the hardness values toward the bulk hardness values discussed hereinbefore. Sintering may be carried out using any suitable technique known in the art. Sintering times may range from about 3.0 to 4.0 hours at a temperature in the range of from about 1950° F. to 2000° F.

If desired, one or more dispersants such as polymethyl methacrylate alcohol and ammonium stearate could be added to the suspension to avoid agglomeration and settling of particles. The dispersant(s) may be present in a concentration from 0.01 to 1.0 wt %, preferably from 0.4 to 0.8 wt %.

If desired, polyvinyl alcohol can be added as a binder to the suspension to increase the strength of the hard shell prior to sintering if necessary. The polyvinyl alcohol may be added in an amount from 0.1 to 3.0 wt %, preferably from 1.0 to 2.0 wt %. The goal of the polyvinyl alcohol binder addition is to coat each particle of sol in the suspension with a monolayer of binder.

The other process which may be used to form the erosion barrier coatings of the present invention involves slurrying processing, such as dipping, spraying, and painting. In this approach, a suspension is formed as described hereinbefore. The thermal barrier coated part or component may then have the suspension applied by said dipping, spraying, or painting. Any suitable technique known in the art may be used to apply the suspension to the thermal barrier coated part or component.

After the suspension has been applied to the thermal barrier coated part or component, the component or part may be dried to remove any excess reagents in the thermal barrier coating. The component or part may be dried as discussed above. Additionally, the component or part may be sintered if desired as discussed above.

Figure 2:
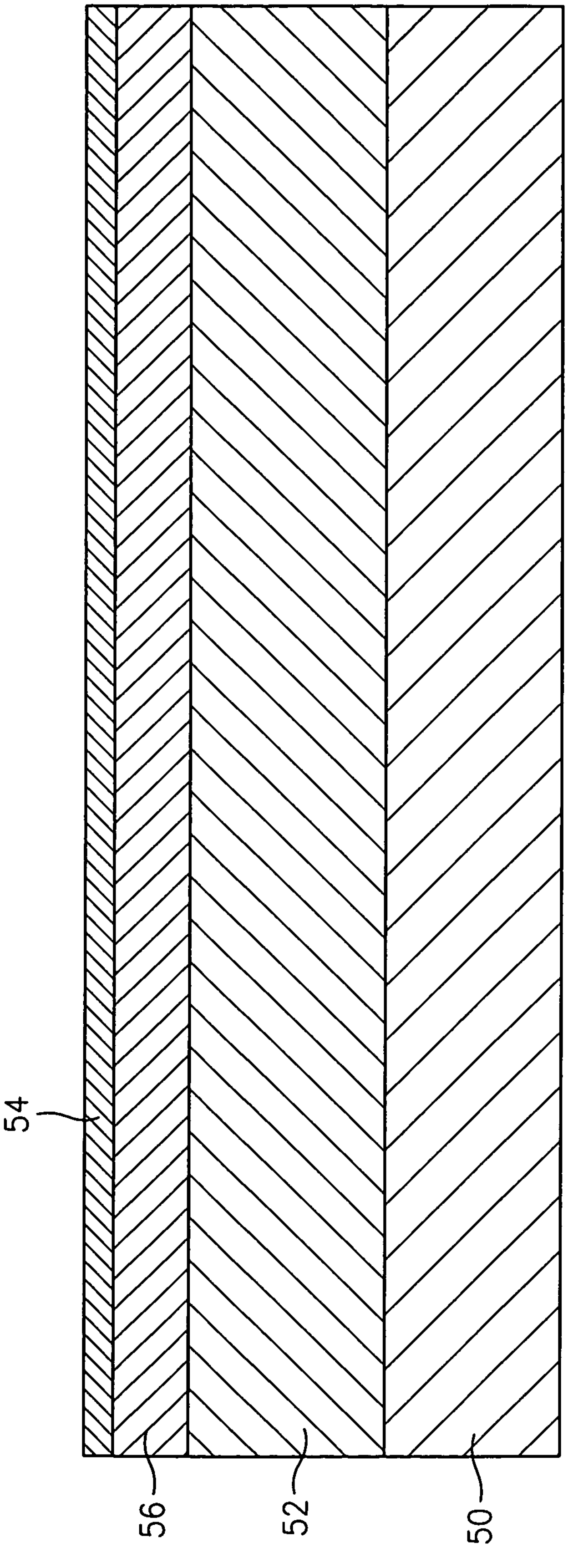
FIG. 2 is a schematic representation of a workpiece having a thermal barrier coating and an erosion barrier.

Referring now to FIG. 2, the processes of the present invention yield a component or part 50 having a thermal barrier coating (TBC) 52 and a hard shell erosion barrier coating 54 deposited over the thermal barrier coating 52. An infiltrated region 56 may be formed between the coating 54 and the coating 52. The infiltrated region may constitute from 5.0 to 100% of the thickness of the TBC measured down from the surface of the TBC. Preferably, the thickness of the infiltrated region is from 10-20% of the TBC thickness. The component or part 50 may be formed from any suitable metallic material known in the art such as a nickel based superalloy.

Erosion of TBCs tends to happen on specific areas of turbine engine components. For example, blade tips get eroded, especially on the suction side. Outer buttresses of vanes also get eroded due to centrifugal forces. Most particulates in the turbine gas stream are centrifuged out to the outer diameter of the turbine, where they do most of their damage. Any relatively steep contours on the turbine engine components get eroded, simply because steep contours increase the local pressure on the part surface by compressing the gas stream, which increases the frequency of collisions with both molecules and any particulates in the gas stream—thus increasing erosion. To minimize the weight added by the hard shell coating and to minimize any potential detrimental effects a hard shell coating might have on TBCs on any turbine engine component, such as reduction of strain tolerance, it would be beneficial to put the hard shell coating only on areas with known susceptibility to erosion.

The placement of a hard shell coating on only a portion of a turbine engine component may be done using a painting process, a dipping process, or an electrophoretic approach. An organic maskant may be applied to all surfaces not intended to be coated.

The placement of the hard shell coating may be done by applying a UV curable resin, such as a commercially available resin known as PHOTORESIST, on the turbine engine component. Then one could apply a sheet metal mask to the areas onto which the deposition of the hard coating is desired. Thereafter, the resin-coated, masked component may be exposed to UV light for a time period from 1.0 to 10 minutes to cure all exposed resin. After curing, the sheet metal mask is removed. Any uncured resin may be washed off. Then one can proceed to the hard coating process. If photolithography is used, drying may be carried out at a temperature in the range of from 600 to 900° F. for a time in the range of from 2.0 to 4.0 hours to burn off the cured resin.

The processes of the present invention may be used to form an erosion barrier coating on a wide variety of parts and components having a thermal barrier coating thereon. The parts or components which may be treated include, but are not limited, any part having an airfoil, any part having a seal, airfoils, seals, and the like. Examples of such parts or components include blades, vanes, stators, mid-turbine frames, combustor panels, combustor cans, combustor bulkhead panels, disk side plates, and fuel nozzle guides.

It is apparent that there has been provided in accordance with the present invention an erosion barrier for thermal barrier coatings which fully satisfies the objects, means, and advantages set forth hereinbefore. While the present invention has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A workpiece comprising:

a substrate formed from a nickel base superalloy;

a thermal barrier coating deposited on and in direct contact with said substrate;

said thermal barrier coating being formed from a zirconia based material;

a hard erosion barrier deposited over said thermal barrier coating, said hard erosion barrier having a Vickers hardness in the range of from 1300 to 2750 kg/mm$^2$ and being formed from a different material than said zirconia based material; and an infiltrated region between said thermal barrier coating and said erosion barrier.

2. The workpiece of claim 1, wherein said hard erosion barrier comprises a layer of alumina having a Vickers hardness of 2650 kg/mm$^2$.

3. The workpiece of claim 1, wherein said hard erosion barrier comprises a layer of silicon nitride having a Vickers hardness of 1900 kg/mm$^2$.

4. The workpiece of claim 1, wherein said hard erosion barrier comprises a layer of silicon carbide having a Vickers hardness of 2750 kg/mm$^2$.

5. The workpiece of claim 1, wherein said hard erosion barrier comprises a layer of molybdenum disilicide having a Vickers hardness of 1300 kg/mm$^2$.

6. The workpiece of claim 1, wherein said workpiece comprises a turbine engine component.

7. The workpiece of claim 1, wherein said thermal barrier coating has a thickness and said infiltrated region constituting from 5.0 to 100% of the thermal barrier coating thickness.

8. The workpiece of claim 1, wherein said thermal barrier coating has a thickness and said infiltrated region is from 10 to 20% of said thermal barrier coating thickness.

9. The workpiece of claim 1, wherein said hard erosion barrier covers only a portion of said workpiece and said thermal barrier coating.

10. The workpiece of claim 1, wherein said workpiece comprises one of a blade, a vane, a stator, a mid-turbine frame, a combustor panel, a combustor can, a disk side plate, and a fuel nozzle guide.

11. The workpiece of claim 10, wherein said workpiece comprises a blade.

12. The workpiece of claim 10, wherein said workpiece comprises a vane.

13. The workpiece of claim 10, wherein said workpiece comprises a stator.

14. The workpiece of claim 10, wherein said workpiece comprises a mid-turbine frame.

15. The workpiece of claim 10, wherein said workpiece comprises a combustor panel.

16. The workpiece of claim 10, wherein said workpiece comprises a combustor can.

17. The workpiece of claim 10, wherein said workpiece comprises a disk side plate.

18. The workpiece of claim 10, wherein said workpiece comprises a fuel nozzle guide.

* * * * *